United States Patent
Hattori et al.

(10) Patent No.: US 7,223,029 B2
(45) Date of Patent: May 29, 2007

(54) OPTICAL FIBER FUSION SPLICER

(75) Inventors: Kazunari Hattori, Yokohama (JP); Ryuichiro Sato, Yokohama (JP); Kazuo Iizuka, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 54 days.

(21) Appl. No.: 10/854,794

(22) Filed: May 27, 2004

(65) Prior Publication Data
US 2005/0041938 A1 Feb. 24, 2005

(30) Foreign Application Priority Data
May 27, 2003 (JP) ............................ P2003-149290
May 24, 2004 (JP) ............................ P2004-153794

(51) Int. Cl.
*G02B 6/255* (2006.01)
(52) U.S. Cl. ........................................................ 385/96
(58) Field of Classification Search ............ 385/95–98; 219/121.13; 65/501
See application file for complete search history.

(56) References Cited

U.S. PATENT DOCUMENTS

| | | | |
|---|---|---|---|
| 3,960,531 A * | 6/1976 | Kohanzadeh et al. .......... | 65/407 |
| 6,336,750 B1 * | 1/2002 | Clark et al. .................... | 385/96 |
| 6,610,965 B1 * | 8/2003 | Tanabe ......................... | 219/383 |
| 6,769,823 B2 * | 8/2004 | Morita et al. ................. | 385/96 |
| 6,791,067 B2 * | 9/2004 | Tanabe ......................... | 219/383 |

FOREIGN PATENT DOCUMENTS

| | | | |
|---|---|---|---|
| JP | 03229206 A | * | 10/1991 |
| JP | 05-150132 | | 6/1993 |
| JP | 2000-098170 | | 4/2000 |
| JP | 2003-248133 | | 9/2003 |
| JP | 2003-287644 | | 10/2003 |

OTHER PUBLICATIONS

Masao Tachikura et al.; "Fusion Mass-Splicing for Optical Fibers"; *NTT Electrical Communications Laboratories Technical Journal*; c. 1985: pp. 63-75; vol. 34, No. 2; Japan.

* cited by examiner

*Primary Examiner*—Sung Pak
*Assistant Examiner*—Daniel Petkovsek
(74) *Attorney, Agent, or Firm*—McDermott Will & Emery LLP

(57) ABSTRACT

The optical fiber fusion-splice device comprises a pair of electric discharge electrodes provided opposed to each other along a predetermined axis, a conductor electrode disposed on one side with respect to a plane with the predetermined axis contained therein, and section for generating electrostatic attraction in the direction tending from the above-described plane toward the one side, between the conductor electrode and the electric discharge path produced between the electric discharge electrodes. The means for generating electrostatic attraction is connected to the conductor electrode. This fusion splicer fusion-splices together the end portions of optical fibers disposed on the other side with respect to the above plane by electric discharge produced between the electric discharge electrodes.

8 Claims, 10 Drawing Sheets

OPTICAL FIBER FUSION SPLICER

BACKGROUND OF THE INVENTION

1. Field of the Invention

The present invention relates to an optical fiber fusion splicer for fusion-splicing together the end portions of optical fibers by electric discharge.

2. Related Background of the Invention

As this type of technique in the prior art, Literature 1 (Tatekura Masao et al. "Fusion Mass-Splicing for Optical Fibers", NTT Electrical Communications Laboratories Technical Journal, Vol. 34, No.2 pp. 63–75 (1985)) describes a fusion splicing technique as follows; removing the coatings of ribbon-type optical fibers to expose a plurality of optical fibers and then holding the end portions of the optical fibers to be fusion-spliced together such that they are provided opposite to each other. The plurality of optical fibers are aligned along the direction of an axis extending between electric discharge electrodes, which are opposed to each other along the horizontal direction, such that the optical fibers are offset upward or downward from the axis. When high-frequency discharge is generated between the electric-discharge electrodes in this state, the end portions of all the optical fibers are uniformly heated, without causing outer optical fibers to impede any electric discharge flow. Consequently, all the optical fibers, both inner and outer optical fibers, can be collectively or in one operation successfully fusion-spliced.

Literature 2 (Japanese Patent Application Laid-Open No. 05-150132) describes, as a technique relating to the above-described fusion splicing technique, a technique wherein the melting amount of optical fibers before and after electric discharge are measured, wherein based on the melting amount the condition of electric discharge or the like is controlled.

SUMMARY OF THE INVENTION

With increases in optical fiber cable density in recent years, the number of cores in ribbon-type optical fibers has been progressively increased and ribbon-type optical fibers, such as 16-core or 24-core optical fibers, have been progressively put to practical use. In order to collectively or in one operation fusion-splice the cores in such multi-core ribbon-type optical fibers by electric discharge, it is necessary to set the distance between the electric discharge electrodes large.

However, in the above-described fusion-splicing technique disclosed in Literature 1, when the distance between the electric discharge electrodes is set large, the middle portion of the path of electric discharge generated between the electric-discharge electrodes is attracted upward, causing the path to be curved into a bow shape. FIG. 10 is a view illustrating a heat intensity distribution around the electric discharge electrodes according to the prior art fusion-splicing technique. This phenomenon is caused mainly by ascending airflows, which result from ambient air heated by electric discharge. Ascending airflows are generated in the direction of the arrow illustrated in FIG. 10, and these ascending airflows cause the middle portion of the electric discharge path to be curved in the direction of the arrow. This results in, for example, the heat intensity distribution between the electric discharge electrodes, as illustrated in FIG. 10. Thus, the end portions of outermost optical fibers 3 (optical fibers proximal to the electric discharge electrodes 4) and optical fibers 3 positioned around the central zone would be heated to higher temperatures than the end portions of the other optical fibers 3. As a result, the end portions of optical fibers would have varying melting amount of fused portions, which prevents all the optical fibers 3 from being collectively or in one operation successfully fusion-spliced.

Therefore, it is an object of the present invention to provide optical fiber fusion splicer which can successfully fusion-splice together the end portions of optical fibers by electric discharge, regardless of the distance between the electric discharge electrodes.

In order to achieve the above-described object, the optical fiber fusion splicer according to the present invention comprises (a) a pair of electric discharge electrodes provided opposed to each other along a predetermined axis; (b) a conductor electrode disposed on one side with respect to a plane with the predetermined axis contained therein; and (c) means for generating electrostatic attraction in the direction tending from the plane toward the one side, between the conductor electrode and the electric discharge path generated between the electric discharge electrodes, the means for generating electrostatic attraction being connected to the conductor electrode; (d) wherein end portions of optical fibers disposed on the other side with respect to the above-described plane are fusion-spliced together by the electric discharge produced between the electric discharge electrodes.

In this optical fiber fusion splicer, when electric discharge is generated between the opposed electric discharge electrodes, electrostatic attraction is generated between the path of electric discharge (hereinafter, referred to as "electric discharge path") and the conductor electrode disposed on the lower side with respect to the predetermined axis which extends between the electric discharge electrodes, namely, on the one side with respect to the plane including the predetermined axis. This electrostatic attraction attracts the electric discharge path towards the conductor electrode side (namely, towards the one side with respect to the above-described plane). Thus, the middle portion of the electric discharge path is prevented from being attracted upward by ambient air convection whereupon the electric discharge path to be curved into a bow-shape. Thus, the optical fiber fusion splicer according to the present invention is capable of fusion-splicing the end portions of optical fibers to each other successfully, regardless of the distance between the electric discharge electrodes. This optical fiber fusion splicer is extremely effective, for example, in the case where the distance between the electric-discharge electrodes must be set large for collectively or in one operation fusion-splicing the respective cores of multi-core ribbon-type optical fibers. The electric-discharge path refers to the path of electrons or ionized gases, etc. resulting from electric discharge generated between the electric-discharge electrodes and is attributed to positive column, for example. Also, the electrostatic attraction refers to coulomb attraction, or attraction generated in accordance with Coulomb's law, being effectively active between areas charged with opposite polarities by electrostatic induction.

Preferably, the means for generating electrostatic attraction includes an electrical grounding portion. By connecting the electrical grounding section, grounded to the ground, to the conductor electrode, means for generating electrostatic attraction can simply constructed.

Preferably, the means for generating electrostatic attraction further includes a capacitive element connected between the conductor electrode and the electrical grounding portion. By disposing the capacitive element, such as a condenser, between the conductor electrode and the electrical grounding portion, the amount of electrostatic attraction, which is generated between the electric-discharge path and the conductor electrode, can be controlled. Thus, it becomes possible to accomplish a suitable amount of electrostatic attraction acting on the electric-discharge path.

Preferably, the capacitive element is an element the capacitance of which is variable. Thus, the amount of electrostatic attraction, which is generated between the electric-discharge path and the conductor electrode can be continuously varied, so that it is made possible to control the amount by which the electrostatic attraction attracts the electric-discharge path, corresponding to the circumstances.

The optical fiber fusion splicer according to the present invention may include at least one pair of the conductor electrodes, which are opposed to each other in a direction substantially orthogonal to the predetermined axis. In this case, the means for generating electrostatic attraction preferably includes capacitive elements the capacitances of which are variable, and a first capacitance control section for periodically varying the capacitance of each of the capacitive elements, wherein each of the capacitive elements is connected to a respective one of the conductor electrodes. Adopting this configuration makes it possible to periodically oscillate the electric discharge path between one conductor electrode side and the other conductor electrode side, while preventing the middle portion of the electric-discharge path from being attracted upward. Namely, it becomes possible to scan the electric-discharge path along the longitudinal direction of optical fibers.

Preferably, the conductor electrode is mounted to a supporting member for aligning optical fibers such that the end portions of the optical fibers are provided opposite to each other. Thus, the conductor electrode can be positioned below the axis extending between the electric discharge electrodes, with a simple configuration, and therefore, the optical fiber fusion splicer can be simplified and miniaturized.

Preferably, the supporting member is a substantially insulating member and disposed between the electric-discharge path and the conductor electrode. This configuration reduces the risk of shorts between the electric-discharge path and the conductor electrode.

When the capacitance of the capacitive element is variable, the means for generating electrostatic attraction preferably includes an input means for inputting the number of optical fiber cores to be collectively or in one operation fusion-spliced, and a second capacitance control section for varying the capacitance of the capacitive element according to the number of cores which is input to the input means. This configuration allows varying the capacitance of the capacitive element according to the number of optical fiber cores to select an optimum electric-discharge path.

Further, when the capacitance of the capacitive element is variable, the means for generating electrostatic attraction preferably includes a measuring means for measuring at least one of atmospheric pressure, humidity and temperature, and a third capacitance control section for varying the capacitance of the capacitive element according to measurement values obtained by the measuring means. This configuration allows varying the capacitance of the capacitive element according to the measurement values obtained by the measuring means, whereby it is made possible to select an optimum electric-discharge path according to environment.

DESCRIPTION OF THE PREFERRED EMBODIMENTS

Hereinafter, preferable embodiments of the optical fiber fusion splicer according to the present invention will be explained with reference to drawings. Like characters are used to refer to like and corresponding parts throughout the drawings and redundant explanations will be omitted.

[First Embodiment]

Figure 1:
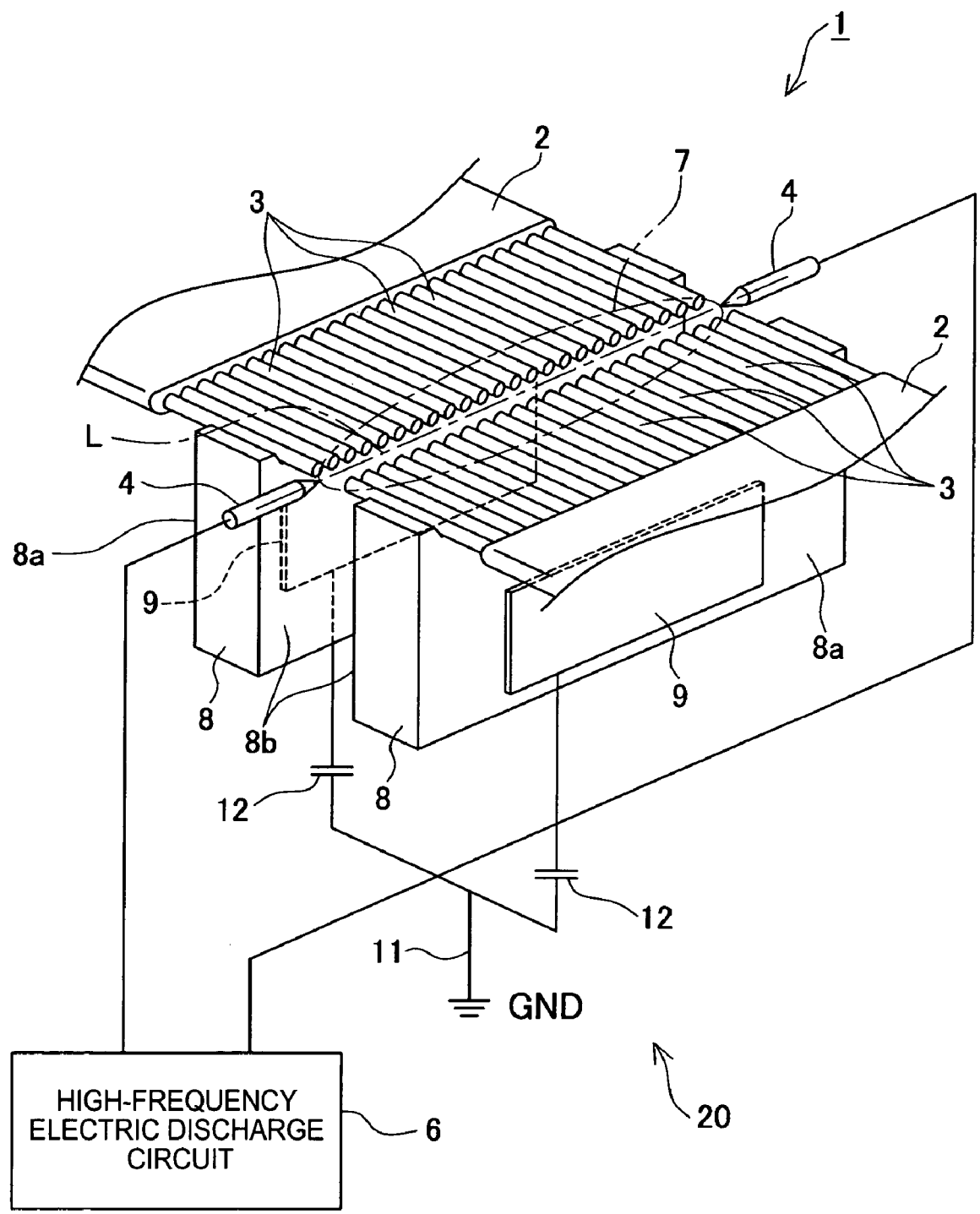
FIG. 1 is a view illustrating an example of the optical fiber fusion splicer according to the first embodiment.

At first, an optical fiber fusion splicer according to a first embodiment of the present invention will be explained. FIG. 1 is a view illustrating an example of the optical fiber fusion splicer according to the first embodiment. The optical fiber fusion splicer 1 illustrated in FIG. 1 is a device for collectively or in one operation fusion-splicing the end portions of the optical fibers 3 included in multi-core (e.g. 24-core) ribbon-type optical fibers 2 to the end portions of the optical fibers included in another multi-core ribbon-type optical fiber 2 by the electric discharge. The fusion splicer 1 includes a pair of electric discharge electrodes, 4 and 4, which are provided opposite to each other along a predetermined axis L substantially extending a horizontal direction. The electric discharge electrodes 4 are each connected to a high-frequency discharge circuit 6.

The high-frequency discharge circuit 6 applies a voltage of from several to several tens of kV between the electric discharge electrodes 4, 4 to generate a high-frequency discharge with a current of several tens of mA having a frequency of about 100 kHz. In this state, flows of electrons or ionized gases are generated to produce an electric discharge path 7. The distance between the electric discharge electrodes 4, 4 is set to, for example, 8 mm to 9 mm in the case of 24-core ribbon-type optical fibers 2.

In the space between the opposed electric discharge electrodes 4, 4, a pair of blocks (supporting members) 8, 8 are aligned in the direction substantially orthogonal to the axis L. Each blocks 8 is formed from zirconium ceramics to be a rectangular solid and has on its top surface grooves for aligning the axes of the optical fibers 3 thereon with the axes of the corresponding optical fibers 3 on the other block 8. For example, these grooves may be V-shaped grooves, referred to as V-grooves. Namely, the surface defining the grooves has a V-shaped cross section.

Each block 8 is configured to align the optical fibers 3 along a direction of the axis L when the optical fibers 3 are disposed in the grooves such that each optical fiber 3 is offset upward from the axis L. Namely, each optical fiber 3 is offset from the axis L by a predetermined amount towards the other side of one side and the other side which are defined by an imaginary plane including the axis L. In the optical fiber fusion splicer 1, since the pair of opposed blocks form supporting members for supporting the optical fibers, the space lying below the axis L is opened. Therefore, it is possible to reserve an installation space and field of view for a microscope for checking the positions of the optical fiber end portions.

A rectangular sheet-type conductor electrode 9 is mounted on the side 8a of each block 8, which is opposite to the side facing the other block 8, such that it is spaced apart from the axis L by a certain distance. Namely, each block 8 has the first side 8a and a second side 8b opposite to the first side 8a and is disposed such that the first side 8a faces the first side 8a of the other block 8. The conductor electrode 9 is mounted on the second side 8b of each block 8. Therefore, a substantially insulating block 8 is disposed between the conductor electrode 9 and the electric discharge path 7.

The pair of conductor electrodes 9, 9 are facing to each other in the direction substantially orthogonal relative to the axis L and are positioned below the axis L, namely on the one side with respect to the above-described imaginary plane including the axis L. The distance between the conductor electrodes 9, 9 is set to 12 mm, for example. Aluminum tapes, for example, may be used as the conductor electrodes 9 and attached to the side surfaces 8a of the V-grooved blocks 8.

By mounting the conductor electrodes 9 onto the V-grooved blocks 8, the conductor electrodes 9 can be positioned below the axis L, which extends between the electric discharge electrodes 4, 4, with a simple configuration. Thus, the optical fiber fusion splicer 1 can be simplified and miniaturized. Further, since the blocks 8, which are insulating members, are disposed between the electric discharge path 7 and the conductor electrodes 9, shorts between the electric discharge path 7 and the conductor electrodes 9 can be prevented.

Each conductor electrodes 9 is connected to a grounding line (electrical grounding portion) 11 grounded to the ground (GND) and a condenser (capacitive element) 12 is connected in series between each conductor electrode 9 and the grounding line 11. In this optical fiber fusion splicer 1, the grounding line 11 and the condenser 12 constitute an electrostatic attraction generating section (means for generating electrostatic attraction) 20.

In the optical fiber fusion splicer 1 constructed as described above, the end portions of the respective optical fibers in one of the ribbon-type optical fibers 2 are collectively or in one operation fusion-spliced to the end portions of the corresponding optical fibers in the other ribbon-type optical fiber 2, as will be described below.

At first, the coatings of the ribbon-type optical fibers 2 are removed to expose the optical fibers 3, whereupon the optical fibers 3 are disposed in grooves in the blocks 8 such that there is a predetermined distance between the end portions of optical fibers to be fusion-spliced together. In this state, the optical fibers 3 are held by clamps (not shown) and high-frequency electric discharge is generated between the electric discharge electrodes 4, 4.

Once the electric discharge path 7 is generated between the electric discharge electrodes 4, 4 by the high-frequency electric discharge, each conductor electrode 9 accumulates electric charge with the polarity opposite to that of the electric discharge path 7 through the grounding line 11 and the condenser 12, generating electrostatic attraction between the electric discharge path 7 and the conductor electrode 9. Components of the electrostatic attraction substantially orthogonal to the axis L, namely parallel to the above-described plane with the axis L contained therein cancel each other, with the result that the electric discharge path 7 is caused to be attracted downward. Namely, the electrostatic attraction generating section 20 serves to feed the conductor electrodes 9 with electric charge with the polarity opposite to that of the electric discharge path 7.

Accordingly, even if the distance between the electric discharge electrodes 4, 4 is set large in order to deal with the multi-core ribbon-type optical fibers 2, it is made possible to prevent the middle portion of the electric discharge path 7 from being attracted upward by ambient air convection whereupon electric discharge path 7 is caused to be curved into a bow-shape. Further, the optical fibers 3 are each held such that they are offset upward from the axis L by a predetermined amount, thereby preventing outermost optical fibers 3 from impeding the electric discharge flows.

As a result, the end portions of all the optical fibers 3 are uniformly heated, and therefore, by pushing one of the ribbon-type optical fibers 2 against the other ribbon-type optical fiber 2, all the optical fibers 3, both inner and outer optical fibers, can be collectively or in one operation successfully fusion-spliced.

The condensers 12 disposed between the conductor electrodes 9 and the grounding line 11 is used for adjusting the amount of the electrostatic attraction, which is generated between the electric discharge path 7 and the conductor electrodes 9. This can be explained as follows, for example. On the supposition that the electric discharge path 7 and a conductor electrode 9 constitute a condenser with a capacitance C1, given each condenser 12 having a capacitance C2, the combined capacitance C of these capacitances is represented by the following equation (1).

$$C = C1/(C1/C2 + 1) \tag{1}$$

This equation (1) shows that the combined capacitance C increases and accordingly the electrostatic attraction increases with increases in the capacitance C2 of each condenser 12, while the combined capacitance C decreases and accordingly the electrostatic attraction decreases with decreases in the capacitance C2 of each condenser 12. Thus, by using the condensers 12 having a predetermined capacitance C2 (e.g. 5 pF), the amount of the electrostatic attraction generated between the electric discharge path 7 and the conductor electrodes 9 can be adjusted such that the electric discharge path 7 is attracted by the electrostatic attraction by an appropriate amount (for example, enabling the straightened electric discharge path 7 along the axis L).

The amount of electrostatic attraction is also varied by other parameters such as the state of high-frequency electric discharge, the shape (area) of the conductor electrodes 9, and the distance between the axis L and the conductor electrodes 9. Therefore, as long as the electric discharge path 7 can be attracted by the electrostatic attraction by an appropriate amount though adjustments of these parameters, each conductor electrode 9 and the grounding line 11 can be connected directly to each other without using the condensers 12. Adopting this configuration can simplify the configuration of the electrostatic attraction generating section 20.

Figure 2:
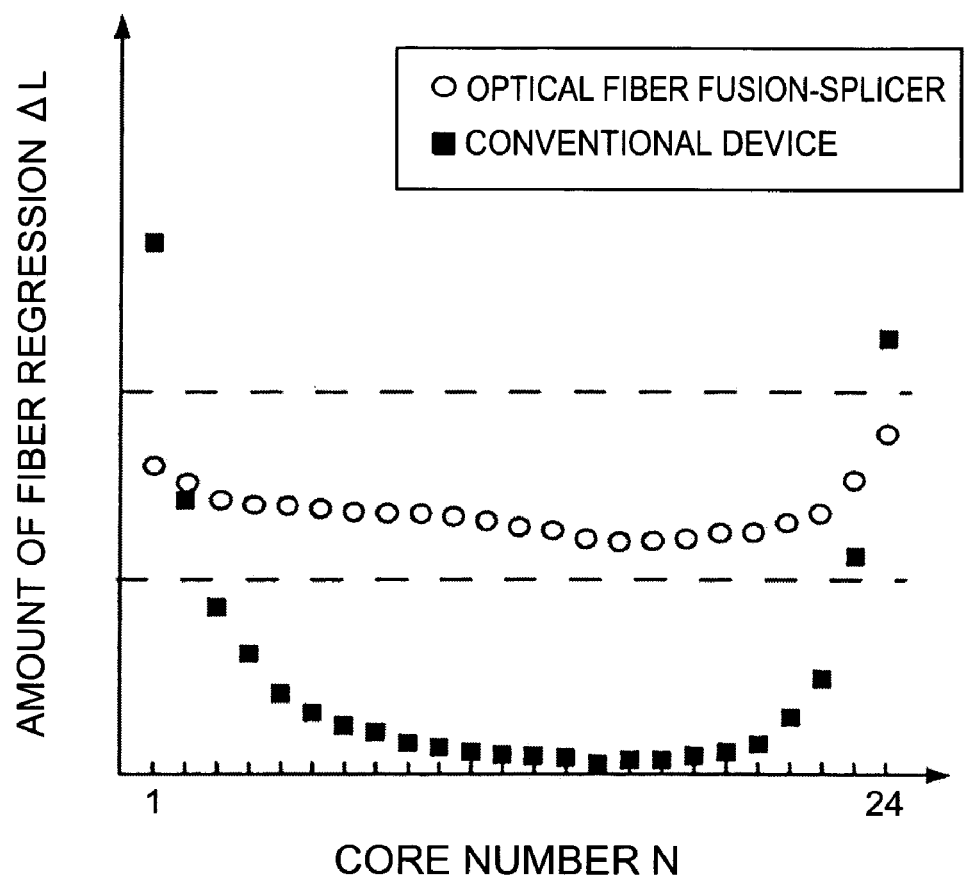
FIG. 2 is a graph illustrating the amount of fiber regression when the end portions of optical fibers to be spliced were fused by electric discharge.

As a conclusive description of the first embodiment, an explanation will now be given about the result of comparison between the optical fiber fusion splicer 1 and a conventional device having neither the conductor electrodes 9 nor the electrostatic attraction generating section 20. FIG. 2 is a graph showing an amount of fiber regression ΔL when the end portions of both optical fibers to be together were fused by electric discharge. In FIG. 2, the vertical axis represents the amount of fiber regression ΔL, and the horizontal axis represents the optical fiber core number, where optical fibers closer to the electric discharge electrodes have core numbers N closer to "1" or "24". The round symbols represent the amount of fiber regression ΔL obtained by using the optical fiber fusion splicer 1, and the rectangular symbols represent the amount of fiber regression ΔL obtained by using the conventional device.

Figure 3A:
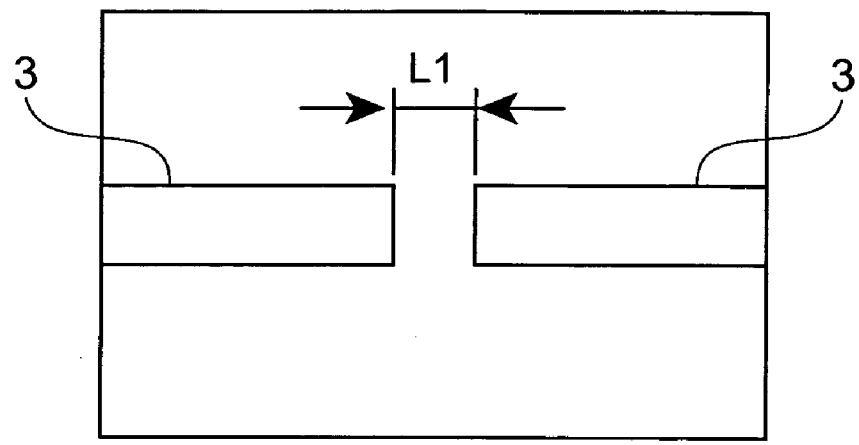
FIG. 3A is a view illustrating the end portions of optical fibers to be fusion-spliced together before being fused by electric discharge.
Figure 3B:
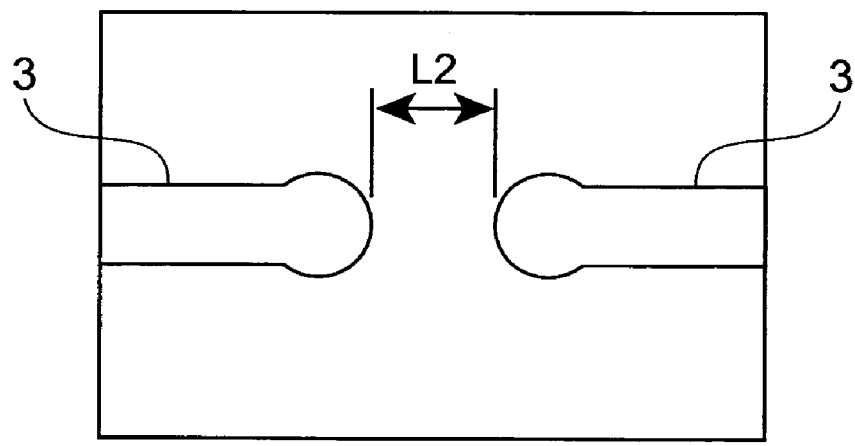
FIG. 3B is a view illustrating the end portions of optical fibers to be fusion-spliced together after being fused by electric discharge.

There will now be given an explanation about the amount of fiber regression ΔL, with reference to FIGS. 3A and 3B. FIG. 3A is a view illustrating the end portions of optical fibers to be fusion-spliced together, which have not been fused by electric discharge. FIG. 3B is a view illustrating the end portions of the optical fibers to be fusion-spliced together, which have been fused by electric discharge. Where L1 is the distances between the end portions of both the optical fibers 3, 3 to be fusion-spliced together before being fused as illustrated in FIG. 3A and L2 is the distance after being fused as illustrated in FIG. 3B, the amount of fiber regression ΔL is calculated by "ΔL=L2−L1".

The graph in FIG. 2 shows that the optical fiber fusion splicer 1 can equalize the amount of fiber regression ΔL (i.e. melting amount) throughout all the optical fibers 3 (core numbers N; 1 to 24) as compared with the conventional device. Further, by using the optical fiber fusion splicer 1 for fusion-splicing, the mean splice loss was reduced to about 0.02 dB.

[Second Embodiment]

Hereinafter, an optical fiber fusion splicer according to a second embodiment of the present invention will be explained. The optical fiber fusion splicer according to the second embodiment differs in the configuration of the electrostatic attraction generating section from the above-described optical fiber fusion splicer 1 according to the first embodiment.

Figure 4:
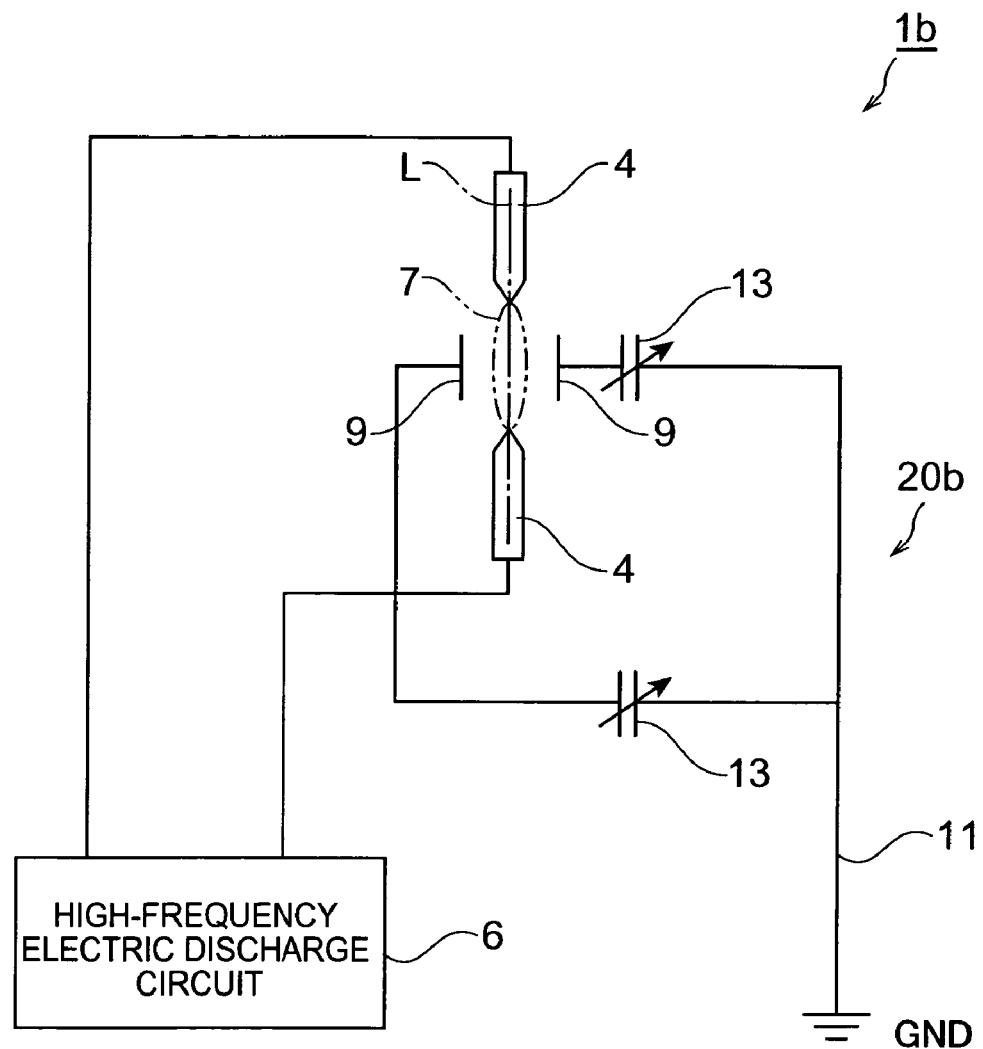
FIG. 4 is a view illustrating an example of the optical fiber fusion splicer according to the second embodiment.

FIG. 4 is a diagram illustrating an example of the optical fiber fusion splicer according to the second embodiment. In the optical fiber fusion splicer 1b according to the second embodiment illustrated in FIG. 4, a variable condenser (capacitive element) 13 is connected in series between each of the pair of conductor electrodes 9 and the grounding line 11. In the optical fiber fusion splicer 1b, the grounding line 11 and the variable condensers 13 constitute an electrostatic attraction generating section (means for generating electrostatic attraction) 20b.

By adopting this configuration, the capacitances of the variable condensers 13 can be adjusted to continuously change the amount of the electrostatic attraction, which is generated between the electric discharge path 7 and the conductor electrodes 9. Accordingly, it becomes possible to control, according to the circumstances, the amount that the electric-discharge path 7 is attracted by the electrostatic attraction. Specifically, a variety of controls as follows become possible.

For example, where the middle portion of the electric discharge path 7 is biased toward one of the conductor electrodes 9 with respect to the axis L, the capacitance of the variable condenser 13 connected in series to this one of conductor electrodes 9 can be reduced (or the capacitance of the variable condenser 13 connected in series to the other conductor electrode 9 can be increased) to balance the electrostatic attraction, whereupon the electric discharge path 7 is caused to be straightened along the axis L.

Further, for example, where optical fibers on one side are to be connected to optical fibers on the other side and the optical fibers on the one side have a fusing temperature higher than that of the optical fibers on the other side, the capacitance of the variable condenser 13 connected in series to the conductor electrode 9 on this one side can be increased (or the capacitance of the variable condenser 13 connected in series to the conductor electrode 9 on the other side can be reduced). This causes the electric discharge path 7 to be biased toward the optical fibers 3 on the one side having the higher fusing temperature to equalize the melting amount of the end portions of the respective optical fibers.

[Third Embodiment]

Hereinafter, an optical fiber fusion splicer according to a third embodiment of the present invention will be explained. The optical fiber fusion splicer according to the third embodiment also differs in the configuration of the electrostatic attraction generating section from the above-described optical fiber fusion splicer 1 according to the first embodiment.

Figure 5:
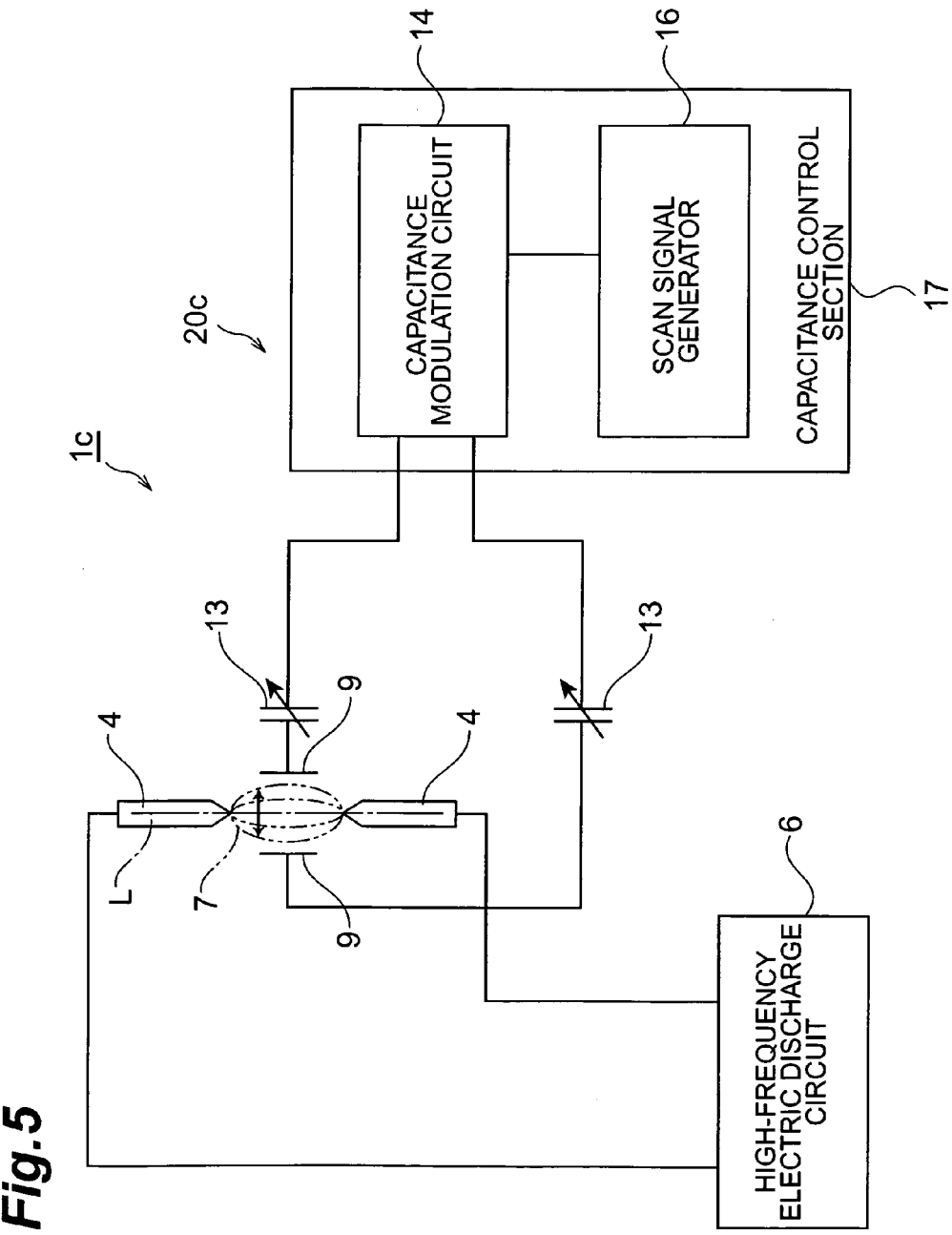
FIG. 5 is a view illustrating an example of the optical fiber fusion splicer according to the third embodiment.

FIG. 5 is a diagram illustrating an example of the optical fiber fusion splicer according to the third embodiment. In the optical fiber fusion splicer 1c according to the third embodiment illustrated in FIG. 5, each of the pair of conductor electrodes 9 is connected to a capacitance modulation circuit 14 through the variable condenser 13 and a scan signal generator 16 is connected to the capacitance modulation circuit 14. In the optical fiber fusion splicer 1c, the capacitance modulation circuit 14 and the scan signal generator 16 constitute a capacitance control section 17 (a first capacitance control means), and the variable condensers 13 and the capacitance control section 17 constitute an electrostatic attraction generating portion (means for generating electrostatic attraction) 20c.

In the optical fiber fusion splicer 1c, the capacitance modulation circuit 14 periodically changes the capacitance of each variable condenser 13 based on scan signals, which are output from the scan signal generator 16. Thus, it is made possible to periodically oscillate the electric discharge path 7 between one conductor electrode 9 side and the other conductor electrode 9 side, while preventing the middle portion of the electric discharge path 7 from being attracted upward. Namely, it is made possible to scan the electric discharge path 7 along the longitudinal direction of the optical fibers.

Accordingly, it is made possible to accomplish specific fusion-splicing such as the cases where optical fibers 3 to be fusion-spliced together have different fusing temperatures; the end portions of optical fibers 3 must be kept away from the electric discharge path 7 in order to lower the heating temperature; optical fibers 3 to be fusion-spliced together have different MFDs (mode field diameter) and therefore dopants within the fiber cores must be diffused in the longitudinal direction of the optical fibers 3 in order to continuously match their MFDs. Such fusion-splicing is extremely easily achieved as compared with configurations, which mechanically move the opposed electric discharge electrodes 4, 4 along the longitudinal direction of optical fibers 3.

[Forth Embodiment]

Hereinafter, an optical fiber fusion splicer according to a forth embodiment of the present invention will be explained. The optical fiber fusion splicer according to the forth embodiment also differs in the configuration of the electrostatic attraction generating section from the above-described optical fiber fusion splicer 1 according to the first embodiment.

Figure 6:
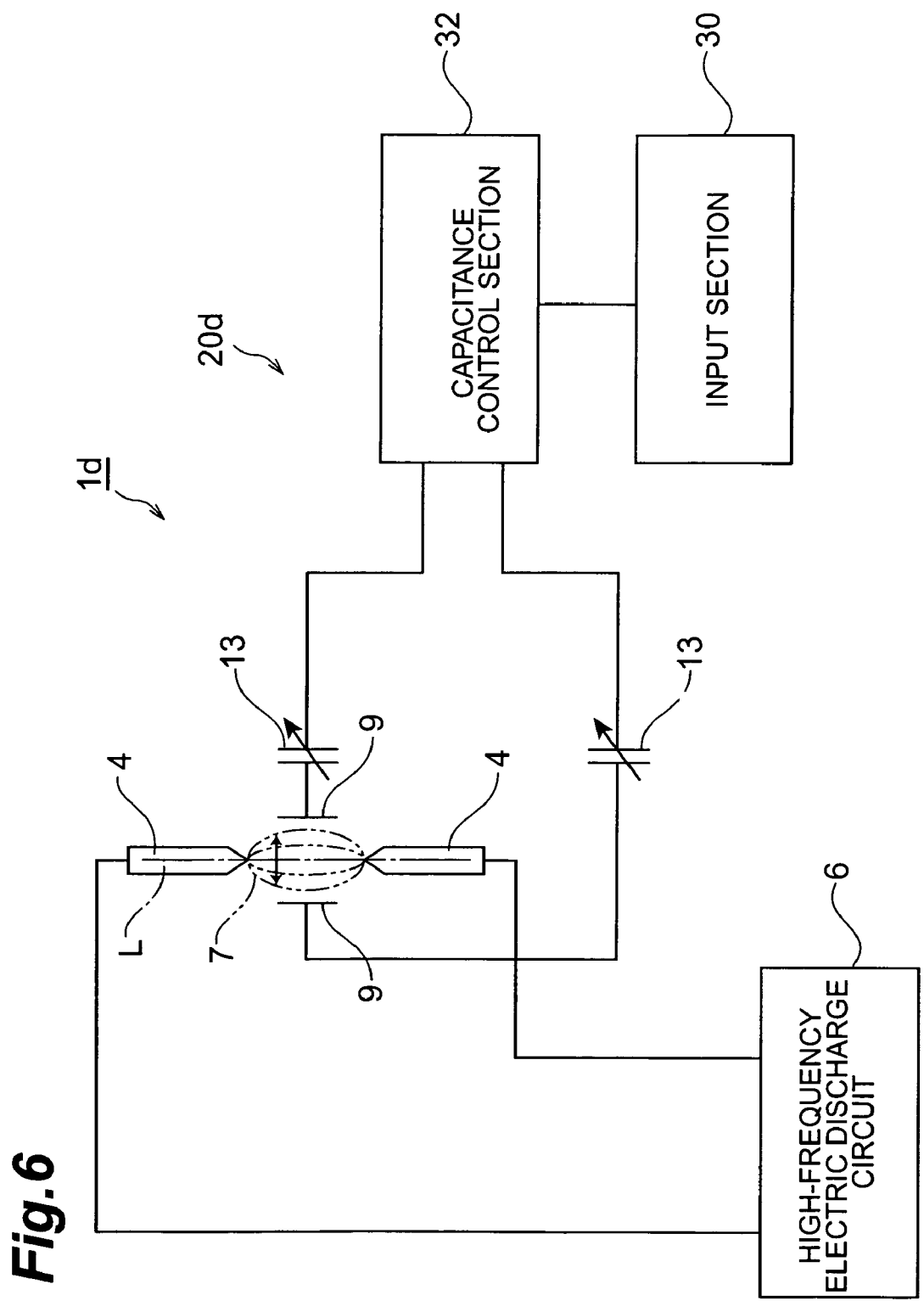
FIG. 6 is a view illustrating an example of the optical fiber fusion splicer according to the fourth embodiment.

FIG. 6 is a diagram illustrating an example of the optical fiber fusion splicer according to the forth embodiment. In the optical fiber fusion splicer 1d according to the forth embodiment illustrated in FIG. 6, each of the pair of conductor electrodes 9 is connected to a capacitance control section 32 through the variable condenser 13, and an input section (input means) 30 is connected to the capacitance control section (a second capacitance control means) 32. In the optical fiber fusion splicer 1d, the input section 30, the capacitance control section 32 and the variable condensers 13 constitute an electrostatic attraction generating portion (means for generating electrostatic attraction) 20d.

The input section 30 is an input device for inputting the number of optical fiber cores to be collectively or in one operation fusion-spliced and outputs a signal relating to the input number of cores ("number of core" signal) to the capacitance control section 32. For example, the input section 30 is composed of a key-entry device equipped with numeric keys for inputting the numbers of cores and confirmation keys for confirming the numbers of cores, etc. The input section 30 is not necessarily limited to a key-entry device and a variety of input devices such as a dial-type switch for confirming the numbers of cores may be utilized as the input section 30.

The absolute capacitance values of the variable condensers 13, are controlled by the capacitance control section 32, based on the "number of core" signal, which is output from the input section 30. The fibers to be spliced form a structure, which impedes the electric discharge flows. Accordingly, in the case where the number of optical fiber cores to be collectively one in one operation fusion-spliced is small, heat is apt to be locally concentrated. Thus, in the case where the number of cores is small, the capacitance control section 32 sets the capacitances of the variable condensers 13 high to enhance the above-described attracting force, namely the electrostatic attraction, to prevent the electric discharge path from being significantly attracted upward.

For example, the capacitance control section 32 is composed of a computer equipped with a memory and a processor. In this configuration, the memory stores a table, which defines the correlation or correspondence between the numbers of optical fiber cores to be collectively or in one operation fusion-spliced and the capacitances of the variable condensers 13 corresponding to the numbers of cores. The processor controls the capacitances of the variable condensers 13 by referring to the table stored in the memory.

Figure 7:
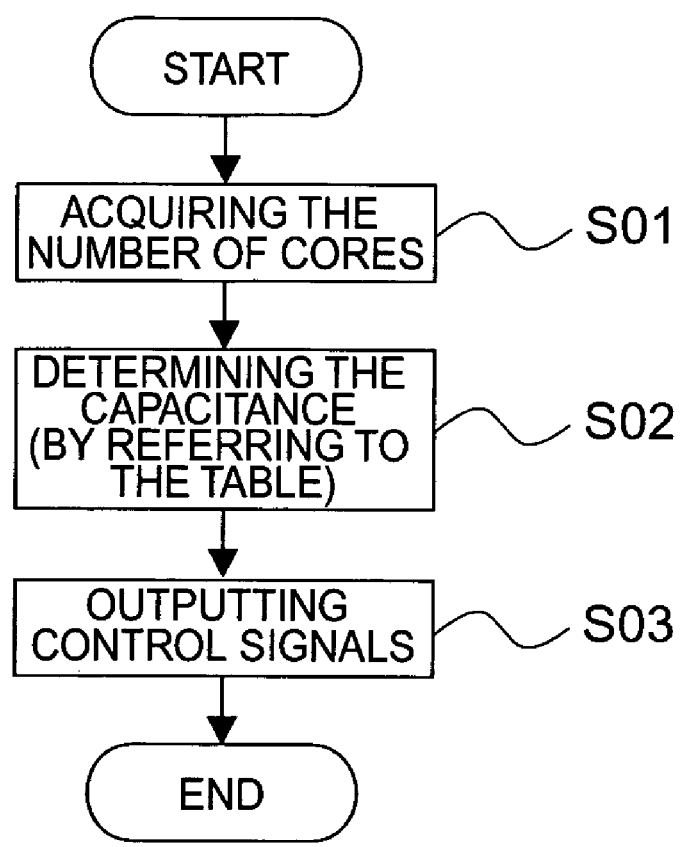
FIG. 7 is a diagram illustrating the flow of the process that is executed in the capacitance control section according to the fourth embodiment.

FIG. 7 is a diagram illustrating the flow of the process that is executed in the capacitance control section according to the forth embodiment. As illustrated in FIG. 7, in the capacitance control section 32, the processor acquires the "number of core" signal from the input section 30 (step S01) and determines, by referring to the above-described memory, the capacitances corresponding to the number of cores specified by the "number of core" signal (step S02). Then, the processor outputs a control signal for controlling the capacitances of the variable condensers 13 to the determined capacitances, to the variable condensers 13 (step S03). Through the control signal, the capacitances of the variable condensers 13 are adjusted to values appropriate to the number of cores. Also, the capacitance control section 32 may determine the capacitances of the variable condensers 13, based on a function, which defines the correlation or correspondence between the numbers of cores and the capacitances of the variable condensers 13 to be set.

[Fifth Embodiment]

Figure 8:
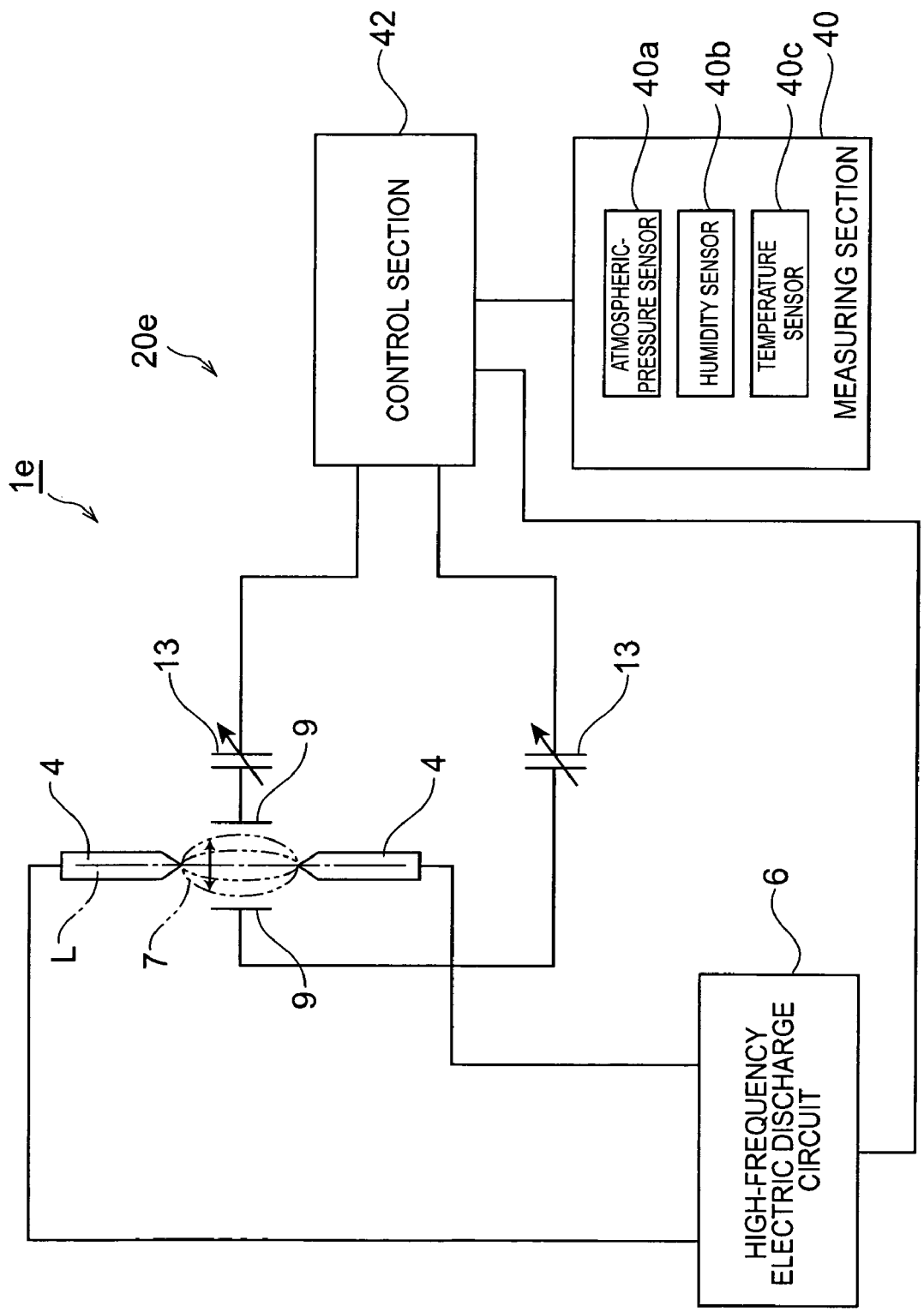
FIG. 8 is a view illustrating an example of the optical fiber fusion splicer according to the fifth embodiment.

Hereinafter, an optical fiber fusion splicer according to a fifth embodiment of the present invention will be explained. The optical fiber fusion splicer according to the fifth embodiment also differs in the configuration of the electrostatic attraction generating section from the above-described optical fiber fusion splicer 1 according to the first embodiment FIG. 8 is a diagram illustrating an example of the optical fiber fusion splicer according to the fifth embodiment. In the optical fiber fusion splicer 1e according to the fifth embodiment illustrated in FIG. 8, each of the pair of conductor electrodes 9 is connected to a control section 42 through the variable condenser 13, and a measuring section (input means) 40 is connected to the control section (a third capacitance control means) 42. In the optical fiber fusion splicer 1e, the measuring section 40, the control section 42 and the variable condensers 13 constitute an electrostatic attraction generating portion 20e.

The measuring section 40 includes an atmospheric-pressure sensor 40a, a humidity sensor 40a and a temperature sensor 40c and outputs measurement values (atmospheric-pressure, humidity and temperature) obtained by each of the sensors to the control section 42.

The control section 42 controls the absolute capacitance values of the variable condensers 13, based on measurement values output from the measuring section 40. For example, in the case where the optical fiber fusion splicer 1e is used at a highland where atmospheric pressure is lower, there is smaller number of ions, which serve as carriers for transferring electric charges of gaseous discharge, which reduces the amount of energy resulting from electric discharge. Thus, in the case of at highlands, the high-frequency electric discharge circuit 6 is controlled such that the electric current increases. On the other hand, at highlands, the atmosphere is thin and therefore the electric discharge path 7 is subjected to less influence by ascending airflows. Thus, in the case of at highlands, or in the case where the measuring section 40 outputs low atmospheric-pressure measurement values, the control section 42 outputs control signals for controlling the capacitances to values less than those for lowlands, to the variable capacitors 13, in order to prevent the electric discharge path 7 from being subjected to excess amounts of electrostatic attraction.

Similarly, the control section 42 controls, for humidity and temperature, the absolute capacitance values of the variable condensers 13, based on values output from the measuring section 40. For example, the control section 42 is composed of a computer equipped with a memory and a processor. In this configuration, the memory stores a table, which defines the correlation or correspondence between values of atmospheric pressure, humidity and temperature and the capacitances of the variable condensers 13 to be set for these values. The processor controls the capacitances of the variable condensers 13 by referring to the table stored in the memory.

Figure 9:
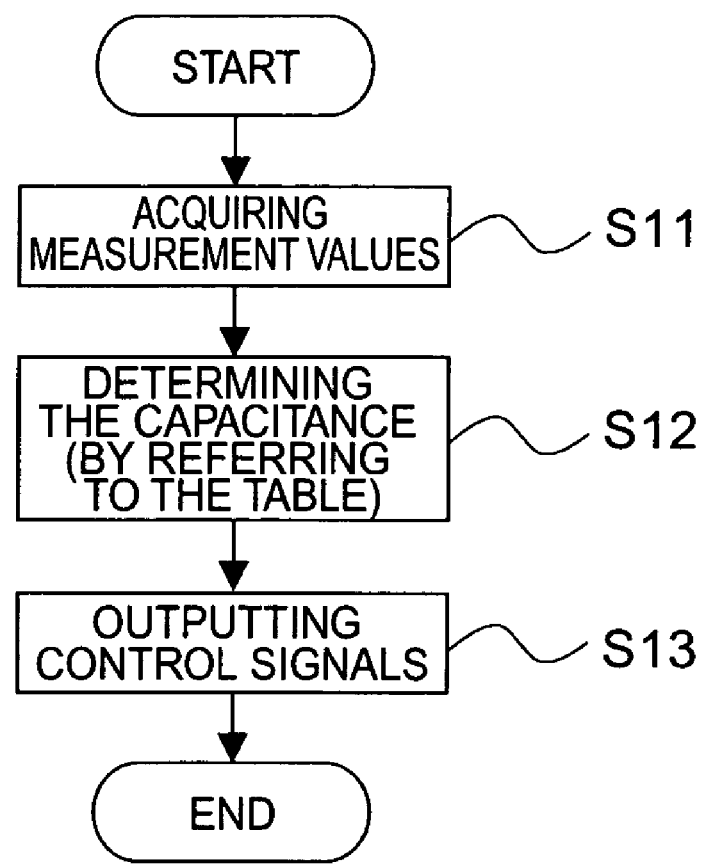
FIG. 9 is a diagram illustrating the flow of the process that is executed in the control section according to the fifth embodiment.
Figure 10:
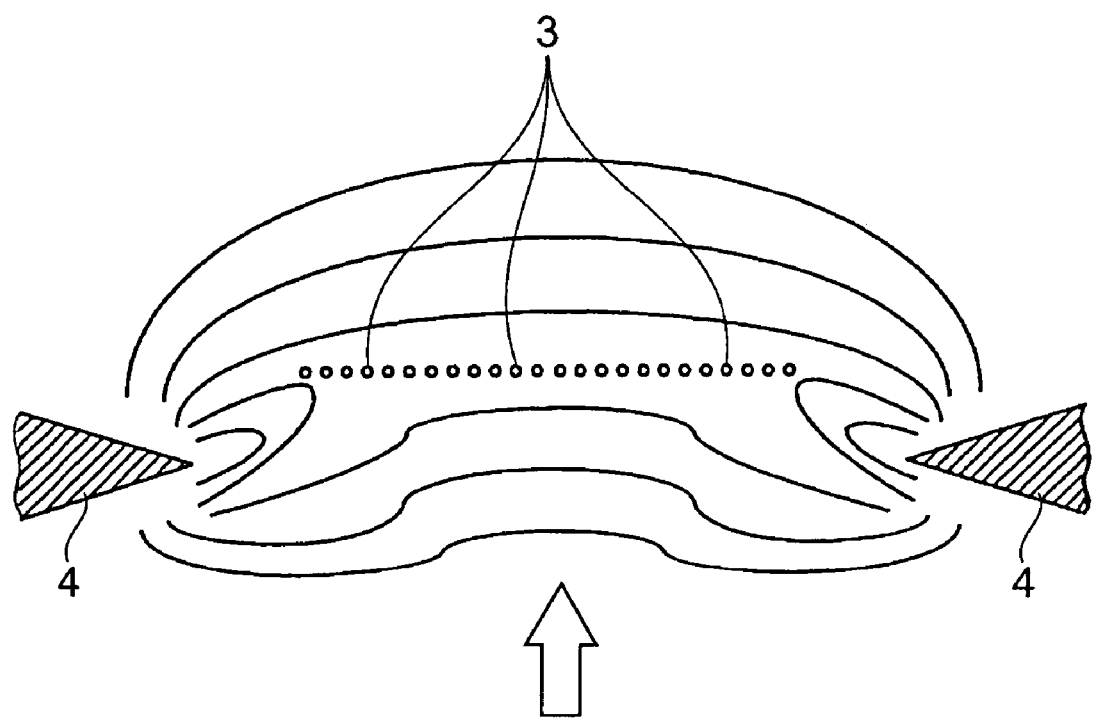
FIG. 10 is a view illustrating a heat intensity distribution around the electric discharge electrodes according to a conventional fusion-splicing technique.

FIG. 9 is a diagram illustrating the flow of the process that is executed in the control section according to the fifth embodiment. As illustrated in FIG. 9, in the control section 42, the processor acquires measurement values from the measuring section 40 (step S11) and determines, by referring to the above-described table, capacitances appropriate to this measurement values (step S12). Then, the processor outputs a control signal for controlling the capacitances of the variable condensers 13 to the determined capacitances, to the variable condensers 13 (step S13). According to the control signal, the capacitances of the variable condensers 13 are adjusted to values appropriate to the measurement values.

The control section 42 may also output control signals for controlling the voltage which is applied between the electric discharge electrodes 4, 4, to the high-frequency electric discharge circuit 6, in order to control the electric current based on measurement values output from the measuring section 40. For example, in the case of at highlands, or in the case where the measuring section 40 outputs low atmospheric-pressure measurement values, the control section 42 outputs control signals for increasing the voltage which is applied between the electric discharge electrodes 4, 4, to the high-frequency electric discharge circuit 6. In a configuration for realizing this control, the above-described memory stores a table, which defines the correlation or correspondence between the values of atmospheric pressure, humidity and temperature and the values of voltages to be applied by the high-frequency electric discharge circuit 6. By referring to the above-mentioned table the processor determines the voltage value appropriate to the measurement values output from the measuring section 40 and outputs control signals for controlling the voltage, which is applied between the electric discharge electrodes 4, 4 to the determined voltage value, to the high-frequency electric discharge circuit 6.

The present invention is not intended to be limited to the above-described respective embodiments. For example, while the optical fiber fusion splicers according to the above-described embodiments include a pair of conductor electrodes 9, 9, a single conductor electrode 9 may be utilized, as long as it is positioned below the axis L, for example, directly below the axis L. Also, in the case where it is desired to attract the electric discharge path 7 in other directions (e.g. the direction towards the upper side with respect to the axis L) than the direction towards the lower side with respect to the axis L, the conductor electrodes 9 may be positioned in these other directions. Further, the shape of the conductor electrode 9 is not necessarily limited to rectangular sheets and may be any shapes, which can retain capacitances.

Further, while the condensers 12, 13 are utilized as capacitive elements in the above-described embodiments, capacitive elements can be easily formed by positioning conductor members with respect to the metal body of the fusion splicer grounded to the ground such that the conductor members are spaced apart, by a slight distance (e.g. the thickness of the coating on the metal body), from the metal body of the fusion splicer. The number of capacitive elements, such as condensers 12, 13 is not necessarily limited to one and the electrostatic attraction generating section may include other type of impedance elements (e.g. electrical resistances).

Further, while the optical fiber fusion splicers 1 according to the above-described embodiments are intended for multi-core ribbon-type optical fibers 2, the optical fiber fusion splicers according to the present invention are applicable to fusion-splicing of a variety of types of optical fibers ranging from single-core to multi-core optical fibers.

Further, in the above-described embodiments, the condensers 12, 13 may be condensers with capacitances of a few pF to 100 pF and preferably 30 to 50 pF. Namely, since if the above-described attracting force is excessive the electric discharge path will be curved in the reverse direction or towards lower side, the capacitances of the condensers are set or adjusted to appropriate values.

As described with respect to the embodiments of the present invention, the optical fiber fusion splicers according to the present invention can fusion-splice the end portions of optical fibers to each other by electric discharge regardless of the distance between the electric discharge electrodes.

What is claimed is:

1. An optical fiber fusion splicer comprising:
a pair of electric discharge electrodes provided opposed to each other along a predetermined axis;
a conductor electrode disposed on one side with respect to a plane with said predetermined axis contained therein; and
means for generating electrostatic attraction in the direction tending from said plane toward said one side, between said conductor electrode and an electric discharge path generated between said electric discharge electrodes, said means for generating electrostatic attraction being connected to said conductor electrode,
wherein end portions of optical fibers disposed on the other side with respect to said plane are fusion-spliced together by the electric discharge generated between said electric discharge electrodes,
wherein said means for generating electrostatic attraction comprises an electrical grounding portion, and
wherein said means for generating electrostatic attraction comprises a capacitive element connected between said conductor electrode and said electrical grounding portion.

2. The optical fiber fusion splicer according to claim 1, wherein said capacitive element is an element of which capacitance is variable.

3. The optical fiber fusion splicer according to claim 2, wherein said means for generating electrostatic attraction comprises;
input means for inputting the number of optical fiber cores to be collectively or in one operation fusion-spliced; and
a second capacitance control section for varying the capacitance of said capacitive element according to the number of cores, which is input to said input means.

4. The optical fiber fusion splicer according to claim 3, wherein said means for generating electrostatic attraction comprises;
a measuring means for measuring at least one of atmospheric pressure, humidity and temperature; and
a third capacitance control section for varying the capacitance of said capacitive element according to measurement values obtained by said measuring means.

5. The optical fiber fusion splicer according to claim 1, comprising at least one pair of conductor electrodes opposed to each other in the direction substantially orthogonal to said predetermined axis.

6. The optical fiber fusion splicer according to claim 5, wherein said means for generating electrostatic attraction comprises:
capacitive elements of which capacitances are variable, each capacitive element being connected to respective one of said conductor electrodes; and
a first capacitance control section for periodically varying the capacitance of each of said capacitive elements.

7. The optical fiber fusion splicer according to claim 1 further comprises:
   a supporting member for aligning said optical fibers such that the end portions of said optical fibers are provided opposite to each other;
   wherein said conductor electrode is mounted on said supporting member.

8. The optical fiber fusion splicer according to claim 7, wherein said supporting member is a substantially insulating member and disposed between said electric-discharge path and said conductor electrode.

* * * * *